United States Patent [19]

Conley et al.

[11] Patent Number: 4,465,260
[45] Date of Patent: Aug. 14, 1984

[54] PLASTIC VALVE AND IMPROVED ACTUATOR THEREFOR

[75] Inventors: Richard W. Conley; Richard P. Tremblay, both of Pittsburgh, Pa.

[73] Assignee: Kerotest Manufacturing Corp., Pittsburgh, Pa.

[21] Appl. No.: 389,953

[22] Filed: Jun. 18, 1982

[51] Int. Cl.³ .............................................. F16K 1/22
[52] U.S. Cl. .................................... 251/305; 251/367
[58] Field of Search ................. 251/305, 367, 292; 137/315

[56] References Cited

U.S. PATENT DOCUMENTS

| | | | |
|---|---|---|---|
| 3,091,428 | 5/1963 | Magos | 251/367 |
| 3,192,945 | 7/1965 | Blakely | 137/375 |
| 3,472,270 | 10/1969 | Masheder | 137/315 |
| 3,913,610 | 10/1975 | Paptzun | 137/375 |
| 4,348,006 | 9/1982 | Schmitt et al. | 251/288 |

FOREIGN PATENT DOCUMENTS

918134 1/1973 Canada .
2291425 6/1976 France .

*Primary Examiner*—Martin P. Schwadron
*Assistant Examiner*—James R. Shay
*Attorney, Agent, or Firm*—Stanley J. Price, Jr.; John M. Adams

[57] ABSTRACT

A molded polyethylene valve body has a flow passage connecting an inlet with an outlet of the valve body. A valve seat formed integral with the valve body surrounds the passage and a plastic valve disc is rotatably positioned in the passage for movement into and out of sealing relation with the valve seat to effect closing and opening of the passage between the inlet and outlet. A valve stem is nonrotatably connected at one end to the valve disc and extends through the valve body and projects upwardly therefrom to an upper end portion. An actuator cap is nonrotatably connected to the valve stem upper end portion. An external valve neck portion surrounds the upper end portion of the valve stem and is positioned on the outer surface of the valve body. The neck portion is adapted to rotatably receive and support the actuator cap. A pair of clamp-like leg members of the neck portion extend circumferentially around the surface of the valve body to connect the neck portion to the valve body. Free end portions of the leg members are brought under tension to maintain the leg members in gripping engagement with the valve body so that the actuating forces from the actuator cap are transmitted from the neck portion and leg members uniformly around the surface of the valve body.

19 Claims, 6 Drawing Figures

PLASTIC VALVE AND IMPROVED ACTUATOR THEREFOR

BACKGROUND OF THE INVENTION

1. Field of the Invention

This invention relates to a plastic valve and more particularly to a butterfly-type valve having a plastic body with an actuator externally supported on the valve body so as to distribute the actuating forces uniformly over the exterior surface of the valve body and prevent the application of actuating forces at a localized point on the valve body.

2. Description of the Prior Art

It is known to fabricate a butterfly-type valve of molded polyethylene and form a unitary valve body that includes a conduit portion for rotatably supporting a valve disc or closure member and a neck portion extending upwardly from the conduit portion for rotatably supporting the valve stem and a valve actuator. The valve conduit portion is molded in surrounding relation with an annular valve seat. The valve seat is embedded in the valve body during the molding process. The valve disc is positioned in the passageway of the conduit portion for movement between an open position aligned with the direction of flow through the valve and a closed position aligned at right angles to the direction of flow. In the closed position, the peripheral edge of the disc tightly engages the valve seat to effect a seal.

The valve disc is nonrotatably mounted on a valve stem which is rotatably supported in the valve body. The stem extends upwardly from the valve disc through the conduit portion and the neck portion of the valve body. The conduit portion and the neck portion are integrally connected during the molding process and a stem opening extends through the conduit portion and the neck portion. Therefore, the neck portion is exposed to the fluid line pressure and forms, with the conduit portion, a pressure boundary within which the fluid must be contained. The neck portion must have a sufficient cross-sectional area to accommodate seals around the valve stem to contain the line pressure. Also, the body of the neck portion must have a sufficient cross-sectional area to withstand the torsional forces transmitted by the valve actuator during operation of the valve.

The integral neck portion of the valve body not only supports the stem that extends upwardly through a bore in the neck portion but also supports the valve actuator. The valve actuator is positioned in surrounding relation with the exterior surface of the neck portion. A known valve actuator includes a cap that is molded onto the upper end portion of the valve stem and extends downwardly therefrom into surrounding relation with the neck portion. The valve stem is movably rotated through a one-quarter turn to move the valve disc between the open and closed valve positions.

The actuator cap is provided with a directional arrow for indicating the direction for turning the valve to the open or closed position. For the open position the indicator is in line with the direction of flow through the conduit portion. In the closed position the indicator is normal to the direction of flow through the conduit portion. To limit the movement of the actuator cap through an arc of 90°, the cap is provided with stops that are movable into and out of engagement with stop surfaces provided on the periphery of the valve neck.

The torque applied to the actuator when the actuator is turned to fully open or fully close the valve is transmitted to the valve neck. Therefore, the valve neck must have a structural strength capable of withstanding the torsional loads generated during operation of the valve. In view of the fact that the polyethylene material from which the valve body is fabricated is a relatively soft and medium yield material, the valve neck must have a substantial wall thickness to withstand the torsional loads from the actuator. Consequently, the wall thickness of the neck must be substantially greater than the wall thickness of the conduit portion of the valve. Increased size of the valve neck is also necessitated by the need for the valve neck to accommodate the bore for the stem and the seals around the stem. The valve neck forming part of the pressure boundary within the valve must meet the rigid design and quality control requirements imposed on the valve body.

It is the conventional practice to fabricate the above described plastic valve by an injection molding process. In view of the fact that the neck portion of the valve has specific structural requirements as above enumerated, the valve mold must be particularly manufactured to form the desired valve neck configuration. This has the undesirable consequence of increasing the cost of fabricating the valve body mold. Because the wall thickness of the neck portion is greater than the wall thickness of the other parts of the valve, a greater volume of plastic material is required to form the valve neck. This increases the overall time for the injected valve body to cool and solidify before the mold can be opened and the formed valve extracted.

A further undesirable consequence of the particular requirements for the formation of an integral valve neck-valve body design is the high tooling cost associated with the specialized valve mold and the somewhat complex machining operations required in making the valve mold. As a consequence the above factors contribute to substantially increasing the time and cost of fabricating a plastic butterfly valve having an integral neck and valve body.

While it has been suggested to fabricate a butterfly-type valve from plastic material such as polyethylene, the known prior art device having an integral valve neck and valve body requires that the valve neck have sufficient structural strength to withstand the torsional forces imparted thereto by the actuator. The fabrication of such a valve is rather expensive and time-consuming. Therefore, there is need for a butterfly-type valve fabricated of a plastic material and having means for supporting the valve actuator in such a manner to withstand the torsional loads imparted by the actuator and permit economical and efficient fabrication and assembly of the valve.

SUMMARY OF THE INVENTION

In accordance with the present invention there is provided a valve assembly that includes a valve body of plastic material. The valve body has a conduit portion including an internal passageway for the conveyance of fluid through the conduit portion. A valve seat is positioned in the passageway and is secured to the conduit portion surrounding the passageway. A valve disc is centrally positioned in the conduit portion for movement into and out of sealing relation with the valve seat to effect closing and opening of the valve assembly. A valve stem has a first end portion nonrotatably connected to the valve disc and a second end portion extending through the conduit portion and projecting upwardly from the valve body. Actuating means is connected to the valve stem second end portion for turning the valve stem to move the valve disc into and out of sealing relation with the valve seat. Support means rotatably supports the actuating means. The support means is positioned on the valve body in surrounding relation with the valve seat. Means is provided for connecting the support means to the valve body to distribute the forces transmitted by the support means over the surface of the valve body.

Further, in accordance with the present invention, there is provided a valve actuator that includes an annular body having a flow passage therethrough with an inlet and an outlet. A valve member is positioned in the flow passage for controlling the flow of fluid between the inlet and the outlet. A valve stem is nonrotatably connected to the valve member for moving the valve member to control the flow of fluid through the flow passage. The valve stem has an upper end portion extending from the annular valve body. An actuator cap is connected to the valve stem upper end portion. A stem retainer surrounds the valve stem and is positioned on the annular valve body. The stem retainer has an outer peripheral surface. The actuator cap surrounds the stem retainer and is rotatably positioned on the stem retainer outer peripheral surface. A clamp extends around the annular valve body to connect the stem retainer to the annular valve body. Means is provided for tensioning the clamp to maintain the clamp in gripping engagement with the annular valve body and permit the transmission of valve actuating forces from the actuator cap through the stem retainer to the clamp for distribution uniformly around the annular valve body.

Accordingly, the principal object of the present invention is to provide a plastic valve assembly having a plastic valve body in which is positioned a rotatable valve disc movable into and out of sealing relation with a valve seat formed integral with the valve body with a valve stem extending from the valve disc upwardly through the valve body and through a stem support structure that is connected externally of the valve body and operable to transmit the actuating forces generated by the actuator surrounding the stem retainer to the outer peripheral surface of the valve body.

Another object of the present invention is to provide a plastic valve of a butterfly-type in which the valve body has a minimum wall thickness of plastic material throughout the entire portion of the body with a valve actuator supported by a neck portion which is a separate element from the valve body and connected by a clamp structure in surrounding relation with a valve body and thereby operable to transmit the actuating forces uniformly over a substantial area of contact between the clamp structure and the valve body.

A further object of the present invention is to provide in a plastic valve a separate valve neck for supporting the actuator so as to remove the valve neck from the pressure boundary within the valve body and reduce the potential for valve failure by positioning the valve neck externally of the pressure boundary.

An additional object of the present invention is to provide a plastic valve having a neck region distinct from the valve body where the neck is operable to support both the actuator and the valve stem in a region removed from the pressure boundary and connected in a manner to the valve body to permit the neck to withstand the torsional loads of the actuator and distribute the loads over the exterior surface of the valve body rather than at a localized point of the valve body.

A further object of the present invention is to provide a plastic butterfly valve that is easily and economically fabricated and assembled by the feature of a valve neck for supporting a valve actuator and a valve stem where the neck is a separate element from the valve body and immovably connected thereto by a saddle-like structure that increases the surface contact of the valve neck with the valve body for uniform distribution of the torsional loads imparted by the actuator over the exterior surface of the valve body.

Another object of the present invention is to provide in a butterfly-type plastic valve, a valve neck which is separate from the valve body permitting the neck to be fabricated of a material stronger than the valve body thereby permitting the neck to be reduced in size and capable of withstanding the torsional loads imparted by the valve actuator.

These and other objects of the present invention will be more completely disclosed and described in the following specification, the accompanying drawings, and the appended claims.

DESCRIPTION OF THE PREFERRED EMBODIMENT

Figure 1:
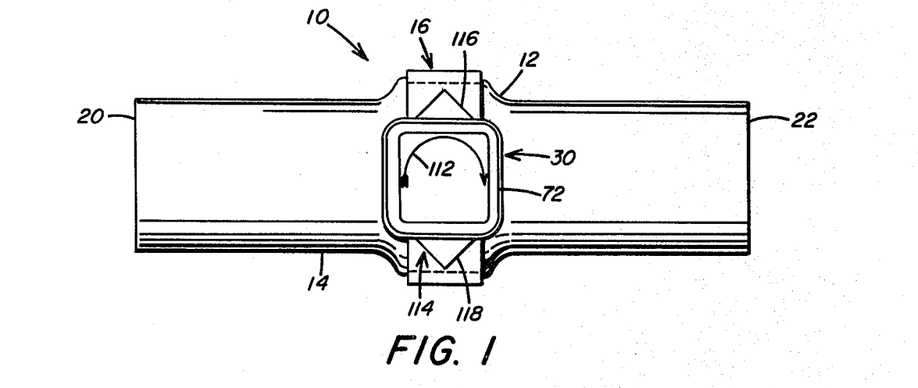
FIG. 1 is a top plan view of a butterfly valve having a plastic valve body, illustrating an actuator having a directional arrow for indicating the direction for turning the actuator to open or close the valve.
Figures 2, 4, 5:
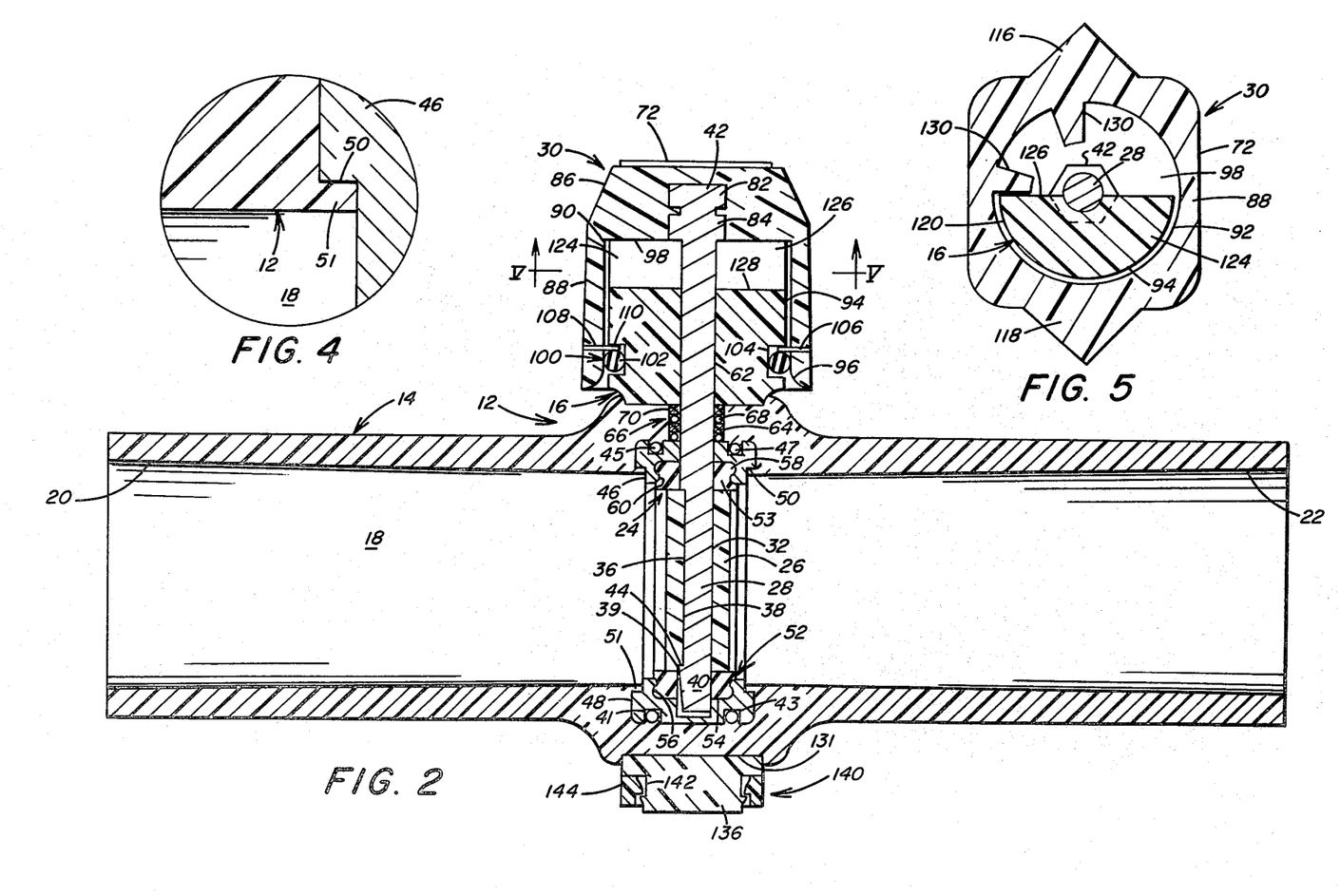
FIG. 2 is a sectional view of the plastic valve shown in FIG. 1, illustrating a metal sleeve molded to the valve body and a resilient sleeve insert connected to the sleeve with a valve neck portion connected to the exterior surface of the valve body for receiving and supporting both a valve stem and the valve actuator.
FIG. 4 is an enlarged fragmentary sectional view of the interlocking connection of the plastic valve body to the metal sleeve for supporting the sleeve insert forming the valve seat.
FIG. 5 is a sectional view taken along line V—V of FIG. 2, illustrating the connection of the valve actuator to the valve neck and the structure for limiting the valve actuator to 90° operation.
Figure 3:
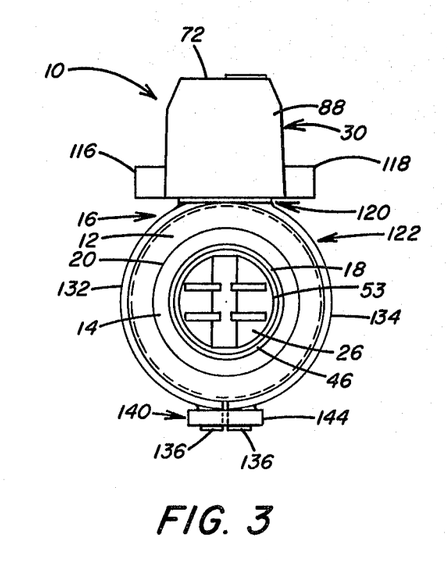
FIG. 3 is an end view of the plastic valve shown in FIG. 1, illustrating the valve neck connected by a clamp structure circumferentially around the valve body and the valve actuator mounted on the valve neck.

Referring to the drawings and particularly to FIGS. 1-3, there is illustrated a valve assembly generally designated by the numeral 10 of the butterfly-type which is adapted for use as a distribution valve or service stop for controlling the flow of a fluid, either a liquid or a gas, through a piping system. The valve assembly 10 includes a valve body generally designated by the numeral 12 having a conduit portion 14 and a valve neck portion 16 which is separate and distinct from the conduit portion 12 and is immovably connected to the conduit portion 14. The valve body 12 is fabricated by conventionally known molding processes of plastic material, such as polyethylene and the like.

A passageway 18 extends through the conduit portion 14. The passageway 18 includes opposite end portions 20 and 22 that are adapted for connection to plastic service conduits by directly heat fusing the plastic valve assembly to the conduits whereby the valve assembly is operable to control the flow of fluid, such as natural gas, from one service conduit connected to one end portion 20 to another service conduit connected to an end portion 22.

The valve assembly 10 includes a valve seat assembly generally designated by the numeral 24 in FIG. 2. A rotatably mounted butterfly disc 26, also fabricated of plastic material, is connected to a valve stem 28 that is rotated by a valve actuator generally designated by the numeral 30. The valve actuator 30 is supported by and positioned in surrounding relation with the valve neck portion 16. Upon the application of torque to the actuator 30, the actuator 30 is operable to move the disc 26 between an open position in which the disc 26 is aligned with the direction of fluid flow through the passageway 18 and a closed position in which the disc 26 is positioned at right angles to the direction of fluid flow. As illustrated in FIG. 2, the valve disc 26 in the closed position sealingly engages the seat assembly 24. The valve stem 28 is preferably a metallic member and is suitably secured as by molding to the plastic valve actuator 30 at the upper end portion of the valve stem 28.

The valve disc 26 is centrally positioned in the conduit portion 14 of the valve body 12. The valve disc 26 has an arcuate configuration and includes a longitudinal bore 32 passing through the disc 26. Communicating with the longitudinal bore 32 are a plurality of radially extending longitudinal grooves (not shown) in the disc 26. A portion of the bore 32 is provided with a flat 36 extending the length of the disc bore 32. The valve stem 28 extends down through the disc bore 32 and is provided with a flat 38 operable to engage the flat 36 of the disc bore 32.

The valve stem 28 also includes a wedge-shaped lower end portion 40 having a shoulder 39 and a hexagonal-shaped enlarged upper end portion 42. The disc bore 32 at the lower end portion thereof includes a shoulder portion 44. With this arrangement when valve stem 28 is inserted within the disc bore 32, the shoulder 39 of the wedge-shaped end portion 40 of stem 28 engages the shoulder 44 of the disc 26. This connection, together with the mating engagement of the stem flat 38 with the disc flat 36, insures that the stem 28 is nonrotatably connected to the disc 26. This arrangement prevents the stem 28 from being forced out of the valve body 12 during service. In addition, suitable adhesive material is injected into the longitudinal grooves of the disc bore 32 around the valve stem 28 to further nonrotatably connect the stem 28 to the valve disc 26.

As illustrated in FIG. 2, the seat assembly 24 includes a metallic sleeve member 46 that is arranged to be received within an annular recess 48 of the valve body conduit portion 14. During the process of molding the valve body 12, the metallic sleeve member 46 is positioned in the core of the molds for forming the valve body 12 and polyethylene is injected into the mold core surrounding the metallic sleeve 46. In this manner the metallic sleeve 46 is secured to the valve body 12 during molding of the valve body 12.

A seal arrangement between the metallic sleeve member 46 and the plastic valve body 12, as illustrated in FIG. 2, prevents leakage between the metallic sleeve member 46 and the plastic valve body 12. A pair of circumferential grooves 41 and 43 are formed on the outer peripheral edge of metallic sleeve 46. The grooves 41 and 43 are equally spaced from the vertical centerline of the metallic sleeve 46. The grooves 41 and 43 are arranged to receive O-rings 45 and 47 respectively. Prior to molding the plastic valve body 12 around the metallic sleeve 46, the O-rings 45 and 47 are positioned in the circumferential grooves 41 and 43. Preferably, the O-rings 45 and 47 are undersized thereby requiring stretching or expanding the resilient material forming the O-rings 45 and 47 to position them in the grooves 41 and 43. In this manner, the O-rings 45 and 47 are securely positioned in the grooves 41 and 43 to grip the body portion of the metallic sleeve 46.

Stretching the O-rings 45 and 47 in surrounding relation with the grooves 41 and 43 prevents the O-rings 45 and 47 from being displaced from the grooves as plastic material is injected under elevated pressure into the mold and into surrounding relation with the metallic sleeve 46. By molding the plastic valve body 12 around the metallic sleeve 46, the sleeve 46 is molded to the valve body 12 and the O-rings 45 and 47 are embedded into the plastic valve body 12, as illustrated in FIG. 2.

As illustrated in detail in FIG. 4, the sleeve member 46 also includes upper and lower peripheral recesses 50. During the molding process the valve body plastic material fills these recesses to form radial shoulders 51 that extend around and grip the sleeve member 46. The shoulders 51 engage the sleeve 46 to lock the polyethylene valve body 12 onto the metallic sleeve member 46 to prevent separation or creeping of the surface of the valve body 12 away from the surface of the metallic sleeve 46.

The metal sleeve member 46 serves as a reinforcing member for a resilient valve seat generally designated by the numeral 52 in FIG. 2. Preferably, the valve seat 52 is an elastomeric insert 53 vulcanized within metal sleeve 46 and is fabricated from a material, such as rubber. Thus, when the valve actuator 30 is rotated to turn the valve disc 26 to the closed position, the valve seat 52 having a limited degree of resilience will be engaged by the outer peripheral surface of the disc 26 to effect a fluid tight seal between the disc 26 and the seat 52 by an interference fit of the disc 26 with the seat 52.

As illustrated in greater detail in FIG. 2, the metallic sleeve member 46 is provided with an inner diameter portion 54 having a constricted opening 56 for receiving the rubber insert 53. The insert 53 has an outer diameter 58 that protrudes outwardly from an annular constricted portion 60. The outer diameter portion 58 of insert 53 is arranged to engage in abutting relation the surface of the inner diameter portion 54 of sleeve member 46. With this arrangement the insert 53 is locked into engagement with the inner diameter portion 54 of metal sleeve member 46.

Figure 6:
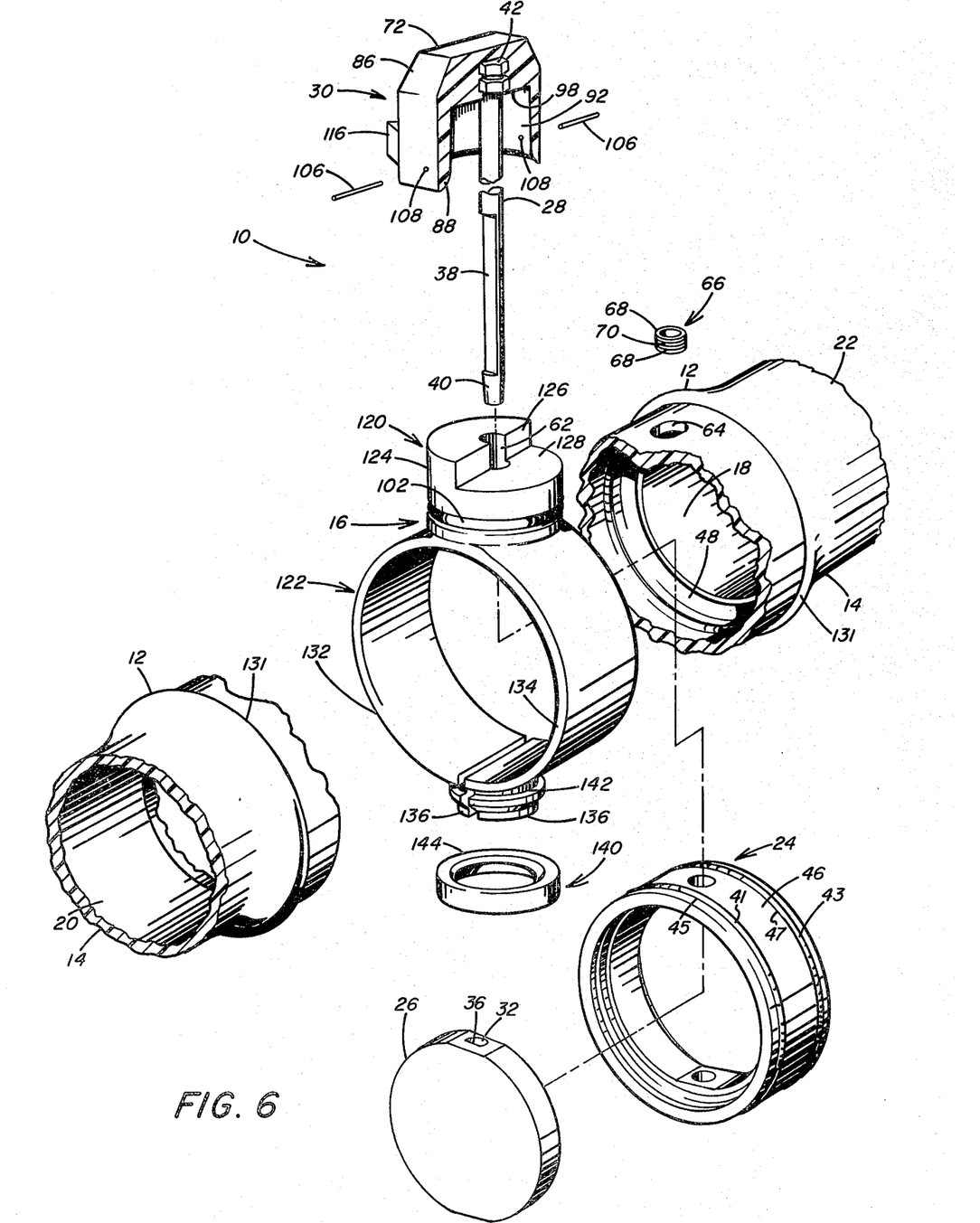
FIG. 6 is a fragmentary, isometric exploded view of the plastic valve assembly of the present invention, illustrating the structure for supporting the valve neck externally of the valve body and the pressure boundary within the valve body.

The valve stem 28 is preferably fabricated of stainless steel and extends through the separate valve neck portion 16 and the butterfly disc 26. The valve stem 28 extends through a bore 62 in the neck portion 16 as illustrated in FIGS. 2 and 6. The bore 62 is aligned with a bore 64 in the valve body 12. The bore 64 is enlarged to receive a seal assembly generally designated by the numeral 66 positioned between the valve body 12 and the valve stem 28 to provide a fluid and pressure tight seal therebetween. The seal assembly 66 includes O-rings 68 embedded in packing 70.

The valve stem 28 includes the enlarged upper end portion 42 which is secured by molding to the valve actuator 30. The valve actuator 30 as illustrated in FIGS. 2, 3, 5, and 6 includes a cap 72 preferably fabricated of plastic material. The stem end portion 42 includes hexagonal sections 82 and 84 molded to the polyethylene cap during fabrication of the cap 72 prior to insertion of the valve stem 28 through the neck portion 16 and the valve body 12. This secures the valve stem 28 to the cap 72.

The cap 72 has a tapered end portion 86 that extends upwardly from a cup-shaped body portion 88 having a recess 90. The valve neck portion 16 extends into the recess 90. The body portion 88, as illustrated in FIG. 5, includes an inner annular surface 92 positioned oppositely of an outer annular surface 94 of the valve neck portion 16. The cap 72 has an open end portion 96 to receive the neck portion 16 and a closed end portion 98 spaced above the top surface of the neck portion 16. With this arrangement, the cap 72 of the valve actuator 30 is rotatably mounted on and supported by the valve neck portion 16.

As further illustrated in FIG. 2, a weather seal assembly generally designated by the numeral 100 is provided between the valve actuator 30 and the valve neck portion 16. The weather seal assembly 100 includes an O-ring 102 received within an external groove 104 of the valve neck portion 16 adjacent the open end 96 of actuator cap 72. The annular inner surface 92 of the cap 72 is positioned in abutting relation with the O-ring 102 to seal the opening between the open end portion 96 of cap 72 and the valve neck portion 16.

To serve as a secondary means of retaining the valve actuator cap 72 on the valve neck portion 16, a plurality of pins 106 are arranged to extend through apertures 108 of the cap 72. The apertures 108 are positioned oppositely of the external groove 104 above the O-ring 102. With this arrangement, the pins 106 extend through the apertures 108 and are wedged into frictional engagement with the O-ring 102 and a shoulder 110 of the valve neck portion 16 formed above the external groove 104. In the event that the butterfly disc 26 should be destroyed thereby releasing the valve stem 28 from the disc 26, the valve actuator 30 would not be expelled from the valve body 12. This secondary retaining assembly insures that the valve actuator 30 is maintained secured to the valve body 12.

Referring to FIGS. 2, 5, and 6 there is illustrated in detail the valve actuator 30 and the separate neck portion 16 for supporting the actuator 30 and the stem 28. For purposes of illustration the valve body 12 has been fragmented in FIG. 6 to separate the end portions 20 and 22 in order to illustrate the internal valve passageway 18; however, it should be understood that the valve body 12 is a single unitary structure and end portions 20 and 22 are integral and not separable.

Rotation of the actuator cap 72 on the neck portion 16 turns the valve stem 28 to turn the disc 26 between the open and closed valve positions. In the closed position the disc 26 sealingly engages the elastomeric sleeve insert 53 that forms the valve seat 52 of the valve assembly 10. In the closed position fluid flow across the boundary of the disc 26 is prevented.

By rotating the actuator cap 72 through an angle of 90°, the valve disc 26 is moved from its interference fit with the insert 53 to a position in line with the direction of fluid flow to permit fluid to pass through the conduit portion 14. The actuator cap 72 includes a directional arrow 112 as illustrated in FIG. 1 for indicating the direction to turn the cap 72 to move the disc 26 to the closed position. The cap 72 also includes a position indicator device generally designated by the numeral 114 in FIGS. 1 and 3.

The position indicator device 114 preferably includes a pair of protrusions 116 and 118 that extend outwardly from opposite faces of the cap 72. When the valve disc 26 is in the closed position, the protrusions 116 and 118 are normal to the direction of flow through the conduit portion 14, as illustrated in FIG. 1. Accordingly, when the valve disc 28 is in the open position, the protrusions 116 and 118 are in line with the direction of fluid flow through the conduit portion 14.

Referring to FIG. 6 the valve neck portion 16 is illustrated in detail and the manner in which it is immovably connected to the valve body 12 conduit portion 14. Hence the valve neck portion 16 is an element separate from the valve body and is not integrally with the valve body 12 in the molding of the valve body 12. The valve neck portion 16 includes a valve actuator and stem retaining portion generally designated by the numeral 120 and a valve body clamp portion 122.

In FIG. 6, the clamp portion 122 is illustrated as being formed integrally with the retaining portion 120. It should be understood, however, in accordance with the present invention that the clamp portion 122 and be suitably connected as a separate element to the retaining portion 120. For example, the retaining member can be fabricated from a high strength plastic and the clamp portion 122 can be a metal band connected to the retaining portion 120.

In the embodiment of the valve neck 16 illustrated in FIG. 6, the retaining portion 120 and the clamp portion 122 are preferably integrally formed and fabricated of a suitable high strength plastic material capable of withstanding the torsional loads applied by the actuator 30 to the neck portion 16 and also rigidly support and retain the valve stem 28. A suitable metallic material can also be used to fabricate the integral portions 120 and 122. However, in all cases the neck portion 16 is structured to withstand high torsional loads generated during the operation of the valve actuator 30. The neck portion 16 is preferably fabricated of a material different from the material forming the valve body 12 because the valve body 12, although subjected to some torsional loads, is not subjected to the magnitude of torsional bonds to which the neck portion 16 is subjected. Therefore, the valve body 12 can be fabricated of a material that is not required to withstand the concentrated forces to which the neck portion 16 is subjected.

The neck retaining portion 120 that supports the actuator 30 also receives and supports the valve stem 28 through the stem bore 62. The retaining portion 120 includes the stem bore 62 and has an upper end portion 124 provided with a vertical planar face 126. A horizontal planar face 128 extends outwardly from the vertical planar face 126. The bore 62 extends through the faces 126 and 128. As illustrated in FIG. 5, the actuator cap 72 includes a pair of stops 130 that extend inwardly from the inner annular surface 92 of the cap 72. The stops 130 are spaced a preselected circumferential distance apart. The stops 130 are movable upon turning of the cap 72 into and out of contact with the neck portion vertical planar face 126. Preferably, the stops 130 are spaced a distance apart to limit the valve actuator 30° to 90° operation. However, in the event the valve actuator 30 is over-torqued, and the above described stop mechanism should fail, the valve actuator 30 is operable to provide 360° operation. Even if the stop mechanism should fail, then the valve assembly 10 will remain operational and the boundary pressure maintained within the valve body 12.

In accordance with the present invention, by assembling the neck portion 16 as a separate element on the valve body 12, the neck portion 16 can be fabricated of a stronger material than the material used to fabricate the valve body 12. This permits the neck portion 16 to withstand the torsional loads generated when the valve actuator 30 is turned and thereby avoid the structural problems of integrally connecting the valve neck 16 to the valve body 12. Also, by providing the neck portion 16 as a separate element from the valve body 12, the neck portion 16 does not form a portion of the pressure boundary in which the fluid pressure must be contained. This substantially eliminates the sealing requirements inherent with an integral neck and valve body construction.

The clamp portion 120 of the valve neck portion 16, as illustrated in detail in FIG. 6, includes a saddle-type configuration adapted to encircle and contact a wide area of the external peripheral surface of the valve body 12. This arrangement permits the torsional loads generated upon turning the actuator cap 72 to be transmitted to the neck retaining portion 120 and the neck clamp portion 122. From the clamp portion 122 the torsional forces are distributed uniformly around the exterior surface of the valve body conduit portion 14. Thus, by assembling the neck portion 16 as a separate element from the valve body 12, substantial torsional loads can be transmitted to the valve body 12 without requiring a massive neck construction as is encountered when the neck portion is formed integral with the valve body portion 12.

To facilitate secure gripping engagement of the neck clamp portion 122 around the valve body conduit portion 14, the conduit portion 14 is provided with a circumferential groove 131 of a preselected width to accommodate the clamp portion 122. Further, in accordance with the present invention, an alternative structure includes the clamp portion 122 provided with a recessed groove to accommodate an annular shoulder extending outwardly from the conduit portion 14 where the annular shoulder is received within the recess of the clamp portion 122.

As illustrated in FIGS. 2, 3, and 6, the clamp portion 122 includes a pair of legs 132 and 134. Each leg 132 and 134 is connected at an upper end to the neck retaining portion 120 and includes at a lower end a free end portion 136. Thus, the legs 132 and 134 substantially extend around the entire peripheral surface of the valve conduit portion 14.

To receive the clamp legs 132 and 134 the valve conduit portion 14 is provided with the circumferential groove or recess 131 on the outer surface thereof. The groove 131 extends completely around the valve body 12. The width of the groove 131 is substantially equal to the width of the clamp legs 132 and 134.

A connecting device generally designated by the numeral 140 connects the free end portions 136 of legs 132 and 134. The connecting device 140 serves to exert a tension on the legs 132 and 134 to maintain the legs 132 and 134 in contact with the outer surface of the valve body 12 within the groove 131 along substantially the entire length of the legs 132 and 134. This arrangement interlocks the contact surface of the legs 132 and 134 with the outer surface of the valve body 12. This facilitates the transmission of torsional loads from the actuator 30 uniformly over the exterior surface of the valve body 12. In this manner the application of torsional loads to the valve body 12 at localized points is prevented and particularly at the region where the neck portion 16 supports the valve stem 28.

The connecting device 140, as illustrated in FIG. 6, includes the leg free end portions 136 positioned in abutting relation to form a recessed internal surface or groove 142 for receiving a snap ring 144. The snap ring 144, when snapped on to the leg free end portions 136, places the legs 132 and 134 in tension so that they securely grip the outer peripheral surface of the valve body 12.

Further in accordance with the present invention the leg free end portions 136 may be brought under tension by a bolted connection of the free end portions 136. Also, a cleat or channel overlapping and drawing together the free end portions 136 can be utilized. A tongue-in-groove engagement of the free end portions 136 or a bolted clamp drawing together the free end portions 136 and the like can be used to connect and tension the clamp leg free end portions 136.

With the above described arrangement, the valve neck portion 16 is positioned externally of the valve body 12 and therefore is not included within the pressure boundary of the valve body 12. By positioning the valve neck portion 16 outside of the valve pressure boundary, the neck portion 16 is not required to be constructed in accordance with the sealing requirements of an element positioned within the pressure boundary. In this manner, the neck portion 16 is not required to be constructed in accordance with the requirements for containing the valve line pressure. The neck portion 16 is constructed with the purpose of supporting the valve stem 28 and the valve actuator 30 in a manner to resist the torsional loads applied to the neck portion 16 when the valve is operated. Accordingly, the neck portion 16 may be fabricated of any desired material to meet these requirements, which material is stronger than the plastic material used to fabricate the valve body 12.

According to the provisions of the patent statutes, we have explained the principle, preferred construction, and mode of operation of our invention, and have illustrated and described what we now consider to represent its best embodiment. However, it should be understood that, within the scope of the appended claims, the invention may be practiced otherwise than as specifically illustrated and described.

We claim:
1. A valve assembly comprising,
a valve body of plastic material,
said valve body having a conduit portion including an internal passageway for the conveyance of fluid through said conduit portion,
a valve seat positioned in said passageway and secured to said conduit portion surrounding said passageway,
a valve disc centrally positioned in said conduit portion for movement into and out of sealing relation with said valve seat to effect closing and opening of said valve assembly,
a valve stem having a first end portion nonrotatably connected to said valve disc and a second end portion extending through said conduit portion and projecting upwardly from said valve body,
actuating means connected to said valve stem second end portion for turning said valve stem to move said valve disc into and out of sealing relation with said valve stem, means separate from said valve body for rotatably supporting said actuating means on said valve body including a unitary body portion having an upper portion and a lower portion, said unitary body upper portion being positioned on said valve body conduit portion between said actuating means and said valve stem, said unitary body lower portion positioned in surrounding relation on the peripheral surface of said valve body conduit portion, and means for connecting said unitary body lower portion to said valve body conduit portion to transfer the torsional forces transmitted by said said actuating means from said unitary body upper portion to said unitary body lower portion and therefrom uniformly around the peripheral surface of said valve body conduit portion.

2. A valve assembly as set forth in claim 1 in which,
said valve body conduit portion having a bore extending upwardly from said passageway,
said upper portion of said means for supporting said actuating means being positioned on said valve body conduit portion and having a bore aligned with said valve body conduit portion bore for receiving said valve stem, and
means for rotatably mounting said actuating means on said support means to permit turning movement of said actuating means on said support means and the distribution of torsional forces from said support means over said valve body external peripheral surface.

3. A valve assembly as set forth in claim 1 in which,
said means for connecting said lower portion to said valve body conduit portion includes means for applying tension to maintain said unitary body lower portion in gripping engagement with the peripheral surface of said valve body conduit portion.

4. A valve assembly as set forth in claim 1 which includes,
said valve body conduit portion having an annular external surface,
said lower portion of said means for supporting said actuating means having a pair of legs each with an arcuate surface conforming to the configuration of said valve body conduit portion, and
said means for connecting being operable to maintain said pair of legs in contact with said valve body annular external surface.

5. A valve assembly as set forth in claim 1 in which,
said valve body includes an internal pressure boundary defined by said internal passageway and said valve seat, and
said means for supporting said actuating means being connected to said valve body externally of said pressure boundary and thereby removed from contact with the fluid forces in said internal pressure boundary.

6. A valve assembly as set forth in claim 1 in which,
said actuating means has an internal surface positioned in surrounding relation with said means for supporting said actuating means,
stop means associated with said actuating means internal surface for moving into and out of contact with said means for supporting said actuating means to limit turning of said valve disc between a preselected open and closed position, and
said actuating means applying torsional forces to said means for supporting said actuating means upon turning of said valve disc with said torsional forces being transmitted from said means for supporting said actuating means to said valve body conduit portion for distribution over the surface of said valve body conduit portion.

7. A valve actuator comprising,
an annular valve body having a flow passage therethrough with an inlet and an outlet,
a valve member positioned in said flow passage for controlling the flow of fluid between said inlet and said outlet,
a valve stem nonrotatably connected to said valve member for moving said valve member to control the flow of fluid through said flow passage,
said valve stem having an upper end portion extending from said annular valve body,
an actuator cap connected to said valve stem upper end portion,
a stem retainer surrounding said valve stem and positioned on said annular valve body, said stem retainer having an outer peripheral surface,
said actuator cap being rotatably positioned on said stem retainer outer peripheral surface,
a clamp integrally connected to said stem retainer and extending around said annular valve body to connect said stem retainer to said annular valve body, and
means for tensioning said clamp to maintain said clamp in gripping engagement with said annular valve body and permit the transmission of valve actuating forces from said actuator cap through said stem retainer to said clamp for distribution uniformly around the periphery of said annular valve body.

8. A valve actuator as set forth in claim 7 in which,
said stem retainer is connected to said clamp to form a saddle-like structure surrounding and engaged to the surface of said annular valve body for distributing torsional loads from said valve stem over the surface of contact of said saddle-like structure with said annular valve body.

9. A valve actuator as set forth in claim 7 in which,
said clamp includes an upper end formed integral with said stem retainer,
said clamp having a pair of leg members extending from said upper end in surrounding relation with said annular valve body to a lower end forming a free end portion of each leg member, and
means for connecting said free end portions of said leg members to draw said leg members in surrounding gripping engagement with said annular valve body to provide surface contact of said leg members with said annular valve body for the distribution of torsional forces uniformly around said annular valve body.

10. A valve actuator as set forth in claim 7 in which,
said annular valve body has an external surface,
said clamp having a surface extending around and positioned in abutting relation with said valve body external surface, and
cooperating means on said clamp surface and said valve body external surface for securely positioning said clamp on said valve body to prevent movement of said clamp on said valve body.

11. A valve assembly comprising,
a valve body having an inlet and an outlet and an outlet connected by a flow passage,
a valve seat in said flow passage,
a valve member rotatably positioned in said valve seat for controlling the flow of liquid between said inlet and said outlet,
actuating means for turning said valve member to control the flow of fluid in said flow passage between said inlet and said outlet,
said actuating means including a lower end portion connected to said valve member and an upper end portion extending upwardly through and out of said valve body,
means externally mounted on said valve body for supporting said actuating means upper end portion and including a neck portion and a clamp portion connected to said neck portion,
said neck portion having a bore for receiving said actuating means upper end portion,
said actuating means upper end portion extending through said neck portion bore and rotatably positioned on said neck portion, and
said clamp portion extending downwardly from said neck portion into surrounding and clamping engagement with said valve body to transfer the torsional loads applied by said actuating means from said neck portion to the periphery of said valve body.

12. A valve assembly as set forth in claim 11 in which,
said neck portion is positioned on said valve body conduit portion to receive said actuating means, said neck portion being a separate element from said valve body and said actuating means such that said neck portion is removed from the effects of fluid flow in said flow passage,
said clamp portion being formed integrally with said neck portion, and
said clamp portion extending circumferentially around the outer exterior surface of said valve body in contact with said valve body.

13. A valve assembly as set forth in claim 12 in which,
said neck portion and said clamp portion are integrally fabricated of a plastic material having a structural strength capable of withstanding the forces imparted to said actuating means to turn said valve member.

14. A valve assembly as set forth in claim 13 in which,
said plastic material forming said neck portion and said clamp portion has a structural strength greater than the material forming said valve body.

15. A valve assembly as set forth in claim 11 in which,
said actuating means upper end portion includes a valve stem portion and an actuator cap, and
said actuator cap being nonrotatably connected to said valve stem portion and rotatably positioned on said neck portion so that the forces applied to said actuator cap to turn said valve stem portion are transmitted to said neck portion and are dissipated throughout said clamp portion and said valve body.

16. A valve assembly as set forth in claim 11 which includes,
a circumferential recess on the periphery of said valve body,
said clamp portion positioned in said circumferential recess, and
means for exerting tension on said clamp portion to maintain said clamp portion fixed in position on said valve body and in contact with the periphery of said valve body.

17. A valve assembly as set forth in claim 11 in which,
said clamp portion has a saddle-type configuration formed by a pair of legs extending from said neck portion around said valve body in contact with the exterior surface thereof,
said legs each having a free end portion, and
means for connecting said legs free end portions to maintain said legs in contact with the exterior surface of said valve body to facilitate the transfer of torsional loads from said actuator means uniformly over the exterior surface of said valve body.

18. A valve assembly as set forth in claim 17 in which,
said means for connecting said legs free end portions includes a snap ring, and
said snap ring encircling said legs to draw said legs together under tension to securely grip the periphery of said valve body.

19. A valve assembly as set forth in claim 11 in which,
said valve body has an outer circumferential surface,
said clamp portion straddling said valve body outer surface, and
means for tensioning said clamp portion to maintain said clamp portion in contact with said valve body around said outer circumferential surface.

* * * * *